(12) United States Patent
Okamoto et al.

(10) Patent No.: US 9,809,298 B2
(45) Date of Patent: Nov. 7, 2017

(54) DRAINAGE SYSTEM

(71) Applicant: MITSUBISHI AIRCRAFT CORPORATION, Aichi (JP)

(72) Inventors: Hiromu Okamoto, Tokyo (JP);
Masayoshi Suhara, Tokyo (JP);
Ryuichi Nagase, Tokyo (JP);
Toshikazu Shigetomi, Tokyo (JP);
Morimasa Ishida, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 140 days.

(21) Appl. No.: 14/977,928

(22) Filed: Dec. 22, 2015

(65) Prior Publication Data
US 2016/0236769 A1    Aug. 18, 2016

(30) Foreign Application Priority Data

Feb. 13, 2015    (JP) .................................. 2015-26297

(51) Int. Cl.
*B64C 5/02*    (2006.01)
*B64C 1/14*    (2006.01)

(52) U.S. Cl.
CPC .............. *B64C 5/02* (2013.01); *B64C 1/1453* (2013.01)

(58) Field of Classification Search
CPC ............ B64C 5/02; B64C 1/1453; B64C 7/00
See application file for complete search history.

(56) References Cited

U.S. PATENT DOCUMENTS 4,743,740 A * 5/1988 Adee ...................... B64D 15/00
156/273.9

FOREIGN PATENT DOCUMENTS

JP    2013-163480 A    8/2013

\* cited by examiner

*Primary Examiner* — Valentina Xavier
(74) *Attorney, Agent, or Firm* — Pearne & Gordon LLP

(57) ABSTRACT

There is provided a drainage system of an aircraft which discharges moisture having entered inside horizontal tails, which are structures of an airframe of an aircraft, toward the rear end of a fuselage, the drainage system including: a drainage channel which includes an introduction end and a discharge end, and by a capillary action delivers moisture introduced from the introduction end toward the discharge end; and a heater which heats and dries the moisture delivered through the drainage channel. The drainage channel of the present invention is preferably composed of a paper drainage material. It is also preferable that the introduction end of the drainage channel is provided in a lowermost region in the vertical direction within an area in which moisture can accumulate inside the horizontal tails while the aircraft is parked.

12 Claims, 5 Drawing Sheets

DRAINAGE SYSTEM

BACKGROUND OF THE INVENTION

Field of the Invention

The present invention relates to a technique for discharging moisture having entered inside stressed skin structures represented by the wings of an aircraft.

Description of the Related Art

In stressed skin structures of an aircraft, for example, the wings, water may enter inside the stressed skin structures through fastener holes which are penetrated by fasteners fixing a skin onto a reinforcing material. Normally, this moisture is frozen while the flight altitude is high, and melts when the aircraft has landed on the ground. Therefore, if the aircraft continues cruising, the moisture having entered there freezes and melts repeatedly and, depending on the position of freezing, may cause a decrease in structural strength. For example, Japanese Patent Laid-Open No. 2013-163480 discloses a device which prevents icing or melts ice on the wings of an aircraft by heating, but this device cannot discharge moisture having entered inside the wings.

Accordingly, it is the current practice to dry moisture by heating the applicable part with heating means, such as a lamp, while the aircraft is parked after landing.

However, the recent airlines are required to reduce the time from landing to the next flight, and, to this end, it is desirable to discharge moisture more quickly from stressed skin structures.

Therefore, the present invention aims to provide a system which can quickly discharge moisture having entered inside stressed skin structures.

SUMMARY OF THE INVENTION

To achieve this object, the present invention provides a drainage system for an aircraft which discharges moisture having entered inside any of structures of an airframe of an aircraft from that structure, the drainage system including: a drainage channel which includes an introduction end and a discharge end, and by a capillary action delivers moisture introduced from the introduction end toward the discharge end; and a heater which heats and dries the moisture delivered through the drainage channel.

According to the present invention, since the drainage channel utilizing a capillary action is provided inside the structure, once the moisture having entered the structure comes into contact with the introduction end of the drainage channel, the moisture can be discharged to the outside of the structure without the need for any special treatment. Moreover, as the moisture delivered toward the discharge end of the drainage channel is dried by the heater, the introduction of remaining moisture from the introduction end is promoted, so that the moisture having entered inside is drained quickly.

In the drainage system of the present invention, it is preferable that the drainage channel is composed of a paper drainage material.

In the drainage system of the present invention, it is preferable that the introduction end of the drainage channel is provided in a lowermost region in the vertical direction within an area in which moisture can accumulate inside the structure while the aircraft is parked.

In the drainage system of the present invention, in a case where the inside of the structure is partitioned into a plurality of cells, the drainage channel can be provided in a specific cell selected from the plurality of cells, or the drainage channel can be provided in all of the plurality of cells.

In the drainage system of the present invention, the heater can dry the moisture using bleed air from an auxiliary power unit of the aircraft as a heat source.

According to the present invention, the drainage channel utilizing a capillary action is provided inside the structure, so that, once the moisture having entered the structure comes into contact with the drainage channel, the moisture is discharged to the outside of the structure without the need for any special treatment. Moreover, as the moisture delivered toward the discharge end of the drainage channel is dried by the heater, the introduction of remaining moisture from the introduction end is promoted, so that the moisture having entered inside is drained quickly.

DETAILED DESCRIPTION OF THE PREFERRED EMBODIMENT

In the following, the present invention will be described on the basis of an embodiment shown in the accompanying drawings.

Figure 1:
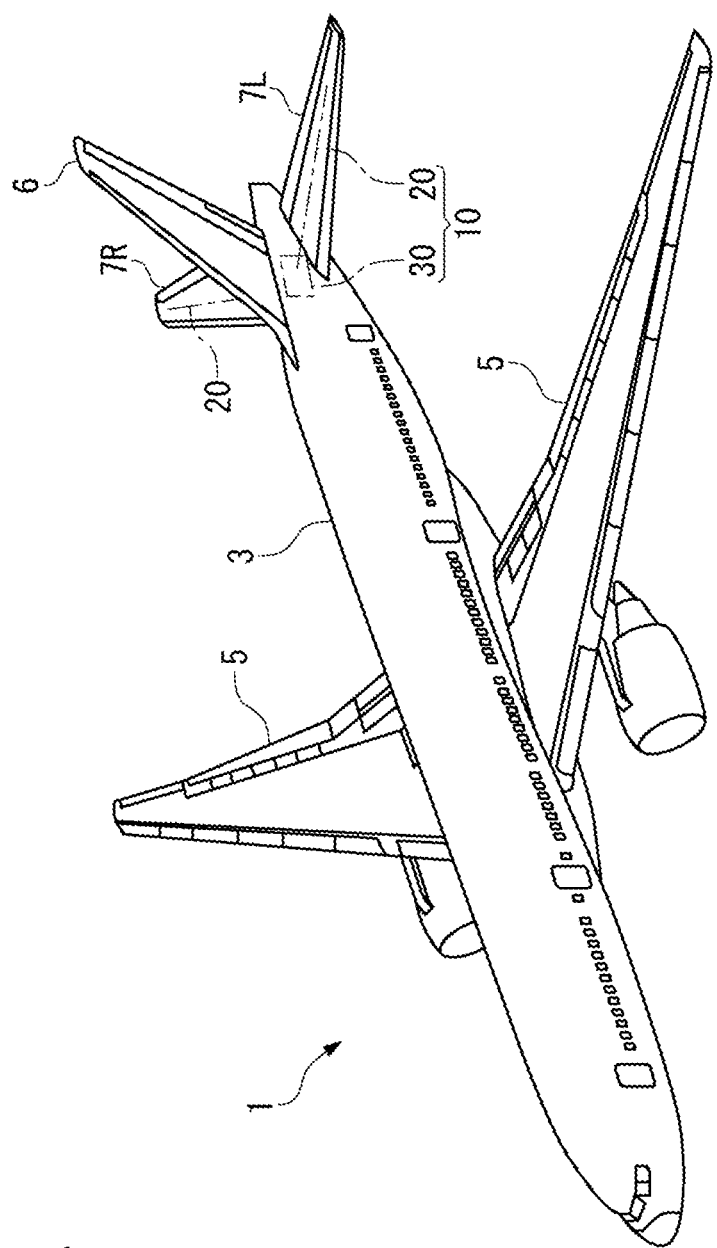
FIG. 1 is a perspective view showing the external appearance of an aircraft to which a drainage system of an embodiment is applied.

As shown in FIG. 1, this embodiment relates to a drainage system 10 which is provided in horizontal tails 7L, 7R, which are one of stressed skin structures of an aircraft 1, and discharges moisture having entered inside the horizontal tails 7L, 7R to a rear end part of a fuselage 3. While the horizontal tails 7L, 7R are taken as an example here, the same drainage system as this embodiment can also be provided in other parts of the aircraft 1.

The drainage system 10 includes a drainage channel 20 which, by a capillary action, delivers moisture having entered inside the horizontal tails 7L, 7R from the inside of the horizontal tails 7L, 7R to the rear end part of the fuselage 3, and a heater 30 which heats and dries the moisture delivered through the drainage channel 20. The drainage channel 20 and the heater 30 will be described below in this order, but before that, the general structure of the horizontal tails 7L, 7R and the behavior of moisture entering inside the horizontal tails 7L, 7R will be described.

Figure 2:
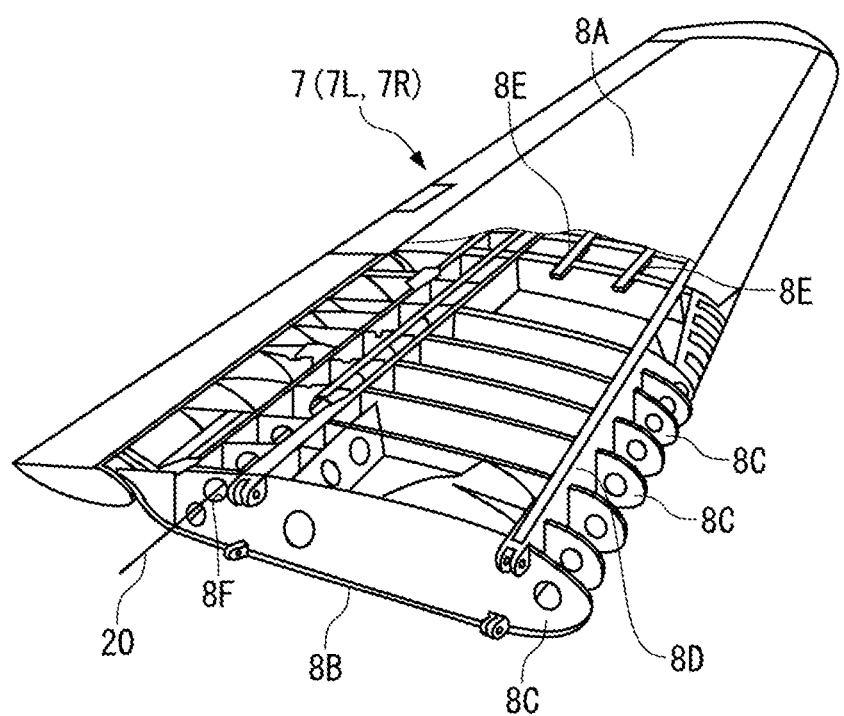
FIG. 2 is a view showing the internal structure of a horizontal tail in which the drainage system of the embodiment is provided.

As shown in FIG. 2, the horizontal tails 7 (7L, 7R) each form a stressed skin structure including an outer panel 8A and an outer panel 8B disposed respectively on the upper side and the lower side in the vertical direction, a plurality of ribs 8C connecting between the outer panel 8A and the outer panel 8B, spar flanges 8D connecting the plurality of ribs 8C with one another in the wingspan direction, and stringers 8E enhancing the strength of the outer panel 8A and the outer panel 8B.

Fasteners (not shown) are used in the horizontal tails 7L, 7R as fastening tools to fix the outer panels 8A, 8B and the ribs 8C, and the fasteners are fastened with the ribs 8C through fastener holes (not shown) penetrating the front and back sides of the outer panels 8A, 8B. During flight of the aircraft 1, moisture in the atmosphere can enter inside the horizontal tails 7L, 7R through these fastener holes. The moisture having entered inside the horizontal tails 7L, 7R is present in the form of a solid phase, ice, while the aircraft is in regions where the flight altitude is high, and the moisture melts into a liquid phase, water, as the aircraft lowers its altitude for landing. If the aircraft 1 continues cruising, the aircraft 1 switches repeatedly between a low altitude and a high altitude, so that the moisture having entered the horizontal tails 7L, 7R freezes and melts repeatedly and, depending on the location of entry, may cause a decrease in structural strength. Therefore, the moisture having entered the horizontal tails 7L, 7R is discharged from the inside of the horizontal tails 7L, 7R using the drainage channel 20, and the discharged moisture is dried using the heater 30 to promote the discharge of moisture from the horizontal tails 7L, 7R.

[Drainage Channel 20]

Figure 3A:
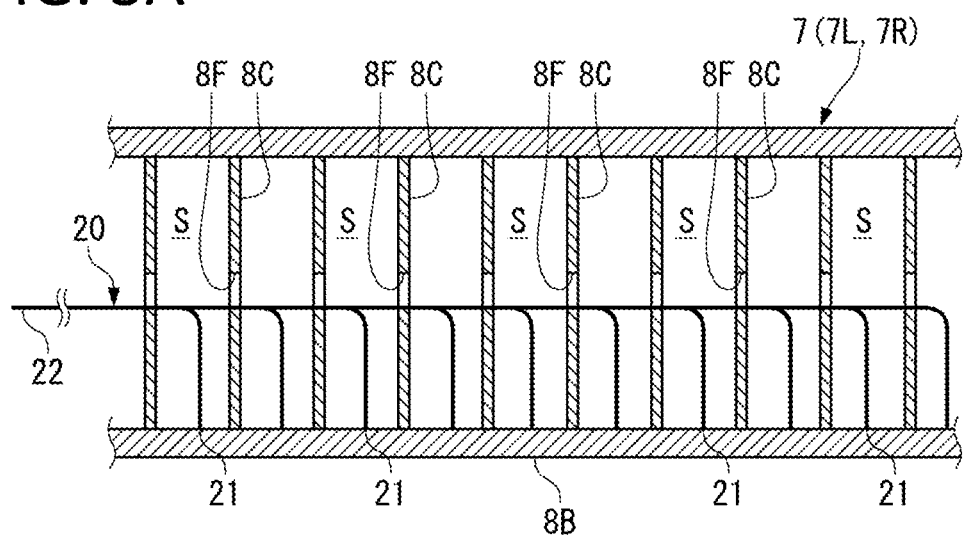
FIGS. 3A and 3B are views each showing a drainage channel which is an element of the drainage system of the embodiment.

As shown in FIG. 3A, the drainage channel 20 extends from introduction ends 21 which are in contact with the inner surface of the outer panel 8B in each cell S of the horizontal tails 7 (7L, 7R) to a discharge end 22 in the rear end part of the fuselage 3, and connects the inside of the horizontal tails 7L, 7R with the inside of the fuselage 3.

The drainage channel 20 delivers moisture having entered the horizontal tails 7 (7L, 7R) from the introduction ends 21 to the discharge end 22 by means of drainage materials D which utilize a capillary action. The drainage channel 20 may be composed of any member as long as it can cause a capillary action, but a member called a "paper drainage material" and a member called a "plastic board drainage material" can be suitably used. These members are long belt-like materials made of paper, synthetic resin, chemical fiber, non-woven fabric, etc. and deliver moisture by a capillary action through pores or fiber clearance of the paper, and there are many cases of application in the civil engineering field where water under soft ground is discharged out of the ground. These members can deliver moisture through their bent portions as well. Besides these members, drainage tubes used in the medical field can also be used as the drainage material D. As the drainage tubes, a film type represented by a Penrose drain, a tube type known under the names of Phycon tube, pleated tube, duple tube, and the like can be used.

Figure 3B:
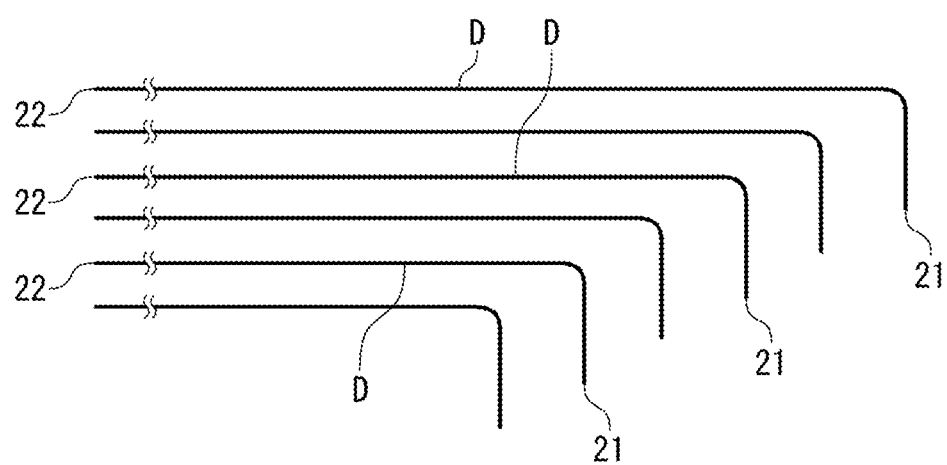

As shown in FIG. 3B, to configure the drainage channel 20 using the drainage material D, for example, a plurality of paper drainage materials are prepared, the introduction end 21 of each drainage material D is disposed at a predetermined position of the outer panel 8B of each cell S, and a portion of each drainage material D drawn out of the cell S is passed through an insert hole 8F of the rib 8C, which partitions the cells S, and extended to the rear end part of the fuselage 3. As the portions which pass through the insert holes 8F of the ribs 8C are bundled, the drainage materials D can be routed apparently as one drainage material.

[Heater 30]

Figure 4:
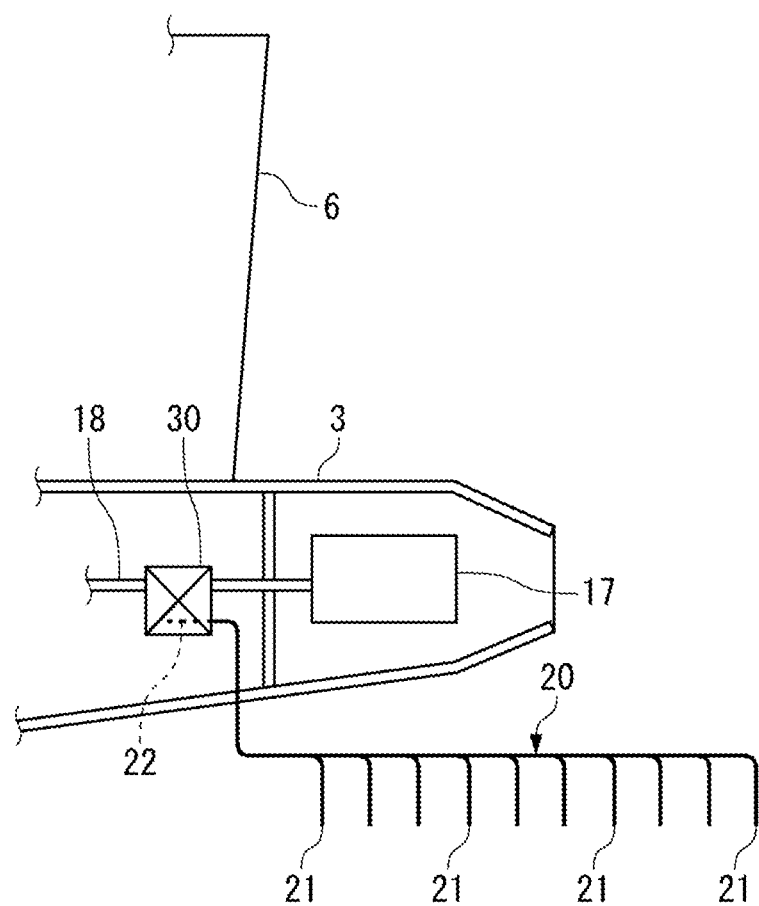
FIG. 4 is a view showing an example of arrangement of the drainage channel and a heater which are elements of the drainage system of the embodiment.

As shown in FIG. 4, the heater 30 is provided to heat and dry the moisture delivered through the drainage channel 20 to the discharge end 22.

While the heater 30 can be newly provided for drying moisture, it is preferable to use an element originally installed in the aircraft 1. In the case of this embodiment in which moisture is discharged from the horizontal tails 7L, 7R, it is preferable to use bleed air from an auxiliary power unit (APU) 17 provided in the rear end part of the fuselage 3. The auxiliary power unit 17 is a small engine fitted separately from a main engine, which provides motive power for the flight of the aircraft 1, in order to supply compressed air, hydraulic pressure, and electric power to parts of the aircraft 1. The auxiliary power unit 17 is used to supply compressed air required for starting the main engine, as well as to supply motive power to devices, including an air conditioning device, while the aircraft 1 is parked. The heater 30 is provided on a pipe 18 through which bleed air from the auxiliary power unit 17 passes, and the discharge end 22 of the drainage channel 20 is inserted into the heater 30, to dry the moisture delivered to the heater 30 using the heat of the bleed air passing through the pipe 18.

[Workings and Effects]

As has been described above, the aircraft 1 includes the drainage system 10 from the horizontal tails 7L, 7R to the rear end of the fuselage 3, and discharges moisture having entered inside the horizontal tails 7L, 7R as follows.

Specifically, as described above, the moisture having entered inside the horizontal tails 7L, 7R freezes and melts repeatedly, and melted moisture accumulates on the lower outer panel 8B of the horizontal tails 7L, 7R. Since the introduction ends 21 of the drainage channel 20 are in contact with the lower outer panel 8B, the melted water is delivered by a capillary action from the introduction ends 21 toward the discharge end 22. Since the discharge end 22 is included in a heating region of the heater 30, the delivered water is quickly dried at the discharge end 22 and in the vicinity of the discharge end 22. As the water in the drainage channel 20 is dried at the discharge end 22 and in the vicinity of the discharge end 22, the capacity for delivering moisture by a capillary action is restored in this portion of the drainage channel 20, so that the introduction of moisture from the introduction ends 21 and the delivery of the moisture toward the discharge end 22 can be performed continuously.

The heater 30 of this embodiment utilizes the auxiliary power unit. Since this auxiliary power unit is driven while the aircraft is parked, it is driven at the same time as the moisture melts. It is therefore possible to heat and dry the moisture delivered through the drainage channel 20 without involving any special operation.

In the drainage system 10 of this embodiment, since the introduction ends 21 of the drainage channel 20 are provided respectively in all the cells S of the horizontal tails 7L, 7R, the melted water generated in each cell S can be discharged.

In the drainage system 10 of this embodiment, the drainage channel 20 is provided as a new component of the aircraft 1. However, the drainage material D used for the drainage channel 20 is not only lightweight like a paper drainage material, for example, but also can be provided inside the cell S through the insert hole 8F provided in the rib 8C. Moreover, the moisture delivered through the drainage channel 20 is dried using the auxiliary power unit 17 with which the aircraft 1 is necessarily equipped, so that no, or few if any, new component is required. Thus, according to this embodiment, it is possible to discharge moisture having entered the horizontal tails 7L, 7R to the outside of the horizontal tails 7L, 7R with little change to the configuration of the existing aircraft 1.

While the preferred embodiment of the present invention has been described above, the configurations presented in the embodiment can be otherwise selectively adopted or appropriately modified into other configurations within the scope of the present invention.

Figure 5A:
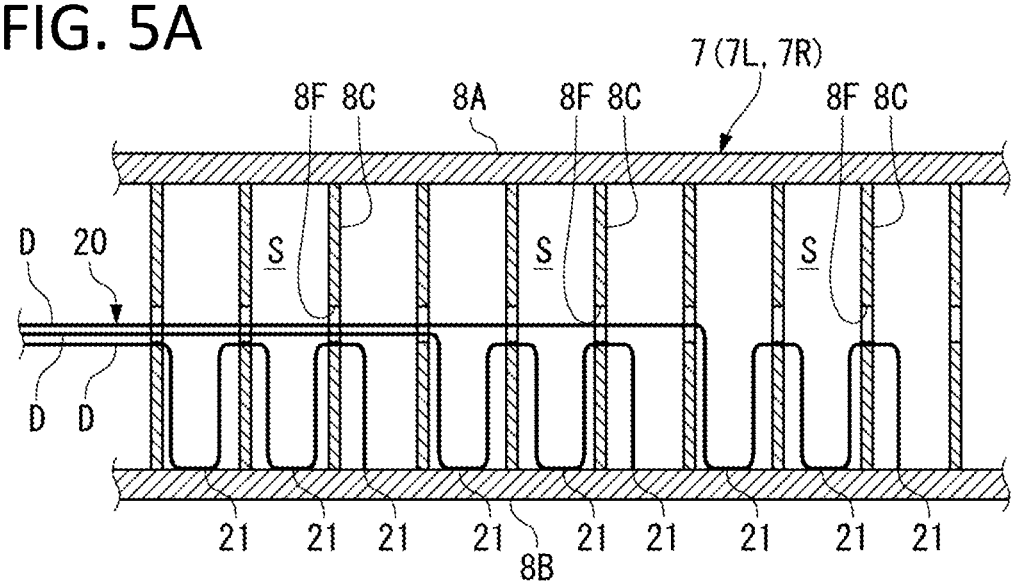
FIGS. 5A, 5B and 5C are views each showing a modified example of the drainage channel of the embodiment.
Figure 5B:
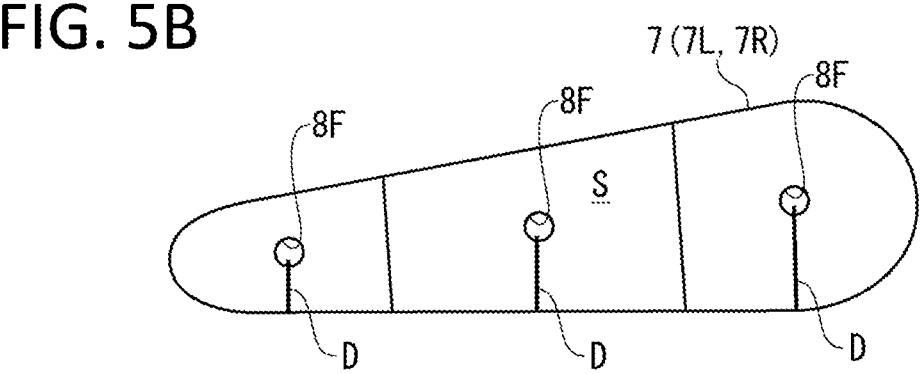

The drainage channel 20 has the independent drainage materials D provided respectively in the cells S, but the present invention is not limited to this example. For example, as shown in FIG. 5A, it is also possible to provide a single drainage material D across a plurality of cells S. FIG. 5A shows an example in which one drainage material D is provided for three cells S, and the drainage material D can be brought into contact with the inner surface of the lower outer panel 8B in each cell S by disposing the drainage material D in a meandering shape. Conversely, it is possible to provide independent drainage materials D in one cell S. For example, as in the example shown in FIG. 5B, the drainage channels 20 composed of independent drainage materials D can be provided at three positions in a leading edge portion, a center portion, and a trailing edge portion in the wing chord direction of one cell S. Alternatively, if the location where moisture accumulates has been known, it is also possible to provide the drainage channel 20 only in that location.

Figure 5C:
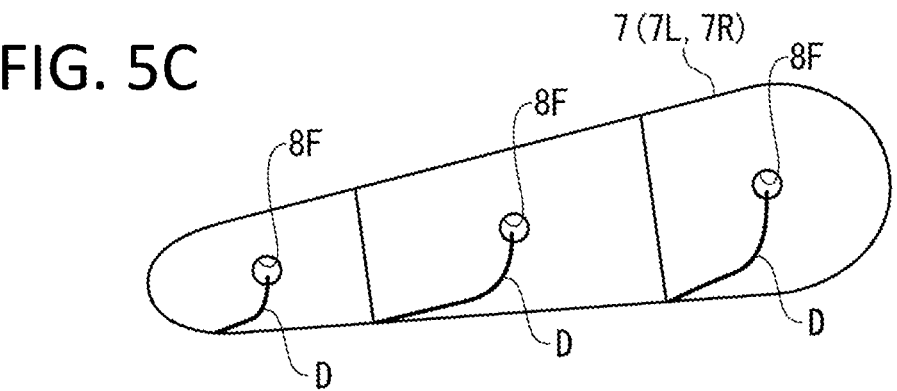

While the position at which the drainage material D is in contact with the lower outer panel 8B inside the cell S is arbitrary, it is preferable to take into account the posture of the aircraft 1 while parked. For example, as shown in FIG. 5C, when the position in the vertical direction of the trailing edge portion of the horizontal tails 7L, 7R while parked is lower than the position of the leading edge portion, since the melted water gathers in the trailing edge portion which is the lowermost region in the vertical direction, it is preferable that the introduction end 21 of the drainage material D is in contact with the lower outer panel 8B in the trailing edge portion.

In the example shown above, the drainage system 10 is provided in the horizontal tails 7L, 7R, but the drainage system of the present invention is widely applicable to stressed skin structures of an aircraft which moisture can enter, for example, main wings 5 and a vertical tail 6.

What is claimed is:

1. A drainage system for an aircraft which discharges moisture having entered inside any of structures of an airframe of an aircraft from that structure, the drainage system comprising:
   a drainage channel which includes an introduction end and a discharge end, and by a capillary action delivers moisture introduced from the introduction end toward the discharge end; and
   a heater which heats and dries the moisture delivered through the drainage channel.

2. The drainage system according to claim 1, wherein the drainage channel is composed of a paper drainage material.

3. The drainage system according to claim 1, wherein the drainage channel is composed of a drainage tube.

4. The drainage system according to claim 1, wherein the introduction end of the drainage channel is provided in a lowermost region in the vertical direction within an area in which moisture can accumulate inside the structure while the aircraft is parked.

5. The drainage system according to claim 1, wherein the drainage channel is in contact with a surface of a component of the structure on which moisture can accumulate inside the structure while the aircraft is parked.

6. The drainage system according to claim 1, wherein, in a case where the inside of the structure is partitioned into a plurality of cells, the drainage channel is provided in a specific cell selected from the plurality of cells.

7. The drainage system according to claim 1, wherein, in a case where the inside of the structure is partitioned into a plurality of cells, the drainage channel is provided in all of the plurality of cells.

8. The drainage system according to claim 1, wherein, in a case where the inside of the structure is partitioned into a plurality of cells, the drainage channel is provided inside the cells through an insert hole provided in a member which partitions the cells.

9. The drainage system according to claim 1, wherein the heater dries the moisture using bleed air from an auxiliary power unit of the aircraft as a heat source.

10. The drainage system according to claim 1, wherein the discharge end of the drainage channel is inserted into the heater.

11. The drainage system according to claim 1, wherein the structure is a horizontal tail.

12. An aircraft comprising the drainage system according to claim 1.

* * * * *